March 9, 1954 P. P-G. HALL 2,671,666
AIR CHUCK
Filed May 17, 1952 2 Sheets-Sheet 1
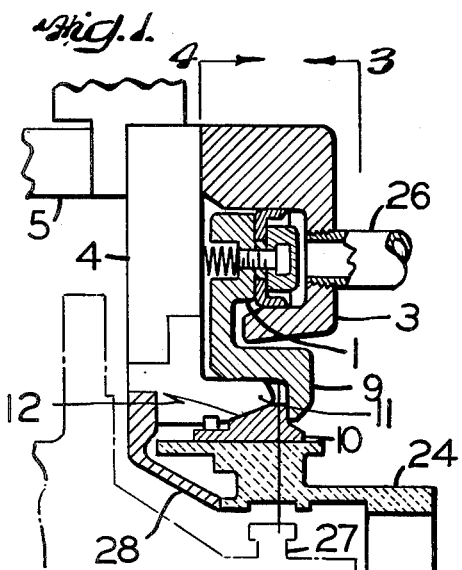
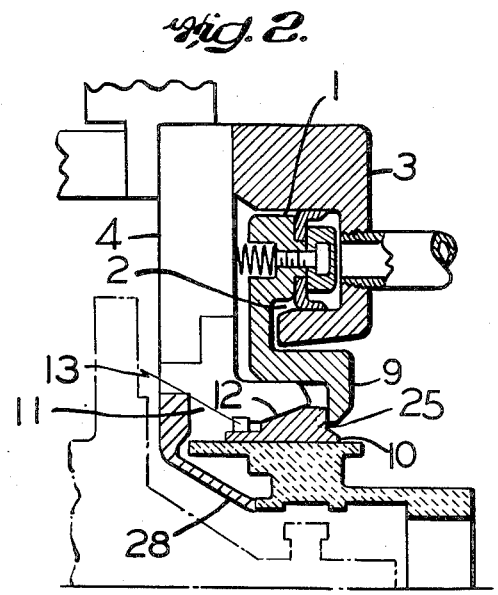
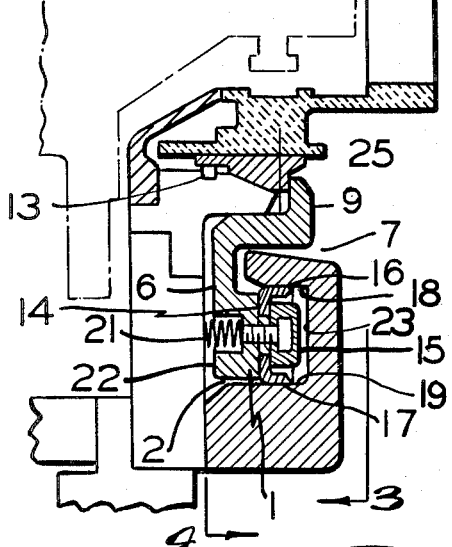
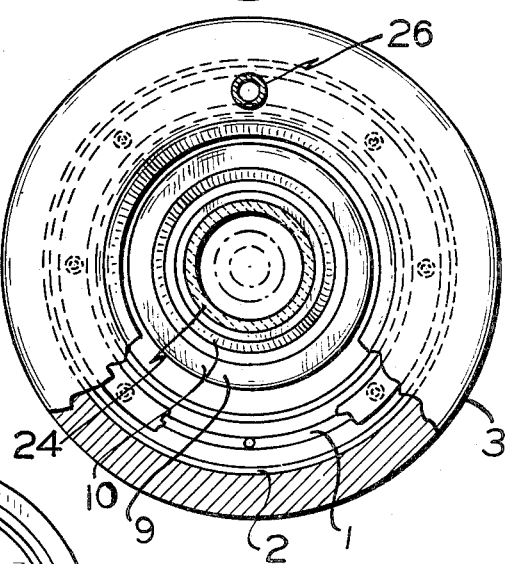
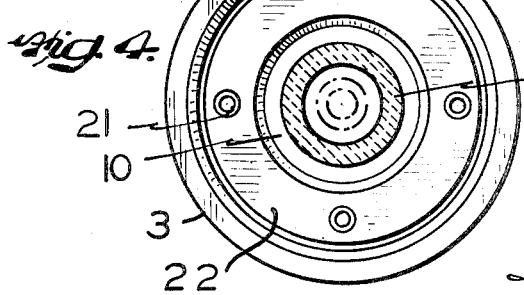
INVENTOR.
PETER P-G. HALL
BY
HIS ATTORNEY March 9, 1954  P. P-G. HALL  2,671,666
AIR CHUCK Filed May 17, 1952  2 Sheets-Sheet 2

INVENTOR.
PETER P-G. HALL
BY
HIS ATTORNEY

Patented Mar. 9, 1954

2,671,666

UNITED STATES PATENT OFFICE 2,671,666

AIR CHUCK

Peter P-G. Hall, Philadelphia, Pa., assignor to The Hall Planetary Company, Philadelphia, Pa., a corporation of Pennsylvania Application May 17, 1952, Serial No. 288,423

4 Claims. (Cl. 279—4)

My invention relates to air pressured chucks and is particularly useful on milling machines of the general type disclosed in United States Letters Patent granted to me as follows: 1,316,718, September 23, 1919; 2,008,757, July 23, 1935: but may be used wherever a piece of work must be held for threading or milling or otherwise machining the interior or exterior of a cylinder and the like.

It is an object of my invention to provide a chuck which is simple to operate and can be adapted to engage securely odd shaped pieces of work.

It is a further object of my invention to provide a chuck which can engage a piece of work at two points.

It is a further object of my invention to utilize fluid pressure to energize the holding elements.

It is still a further object of my invention to provide a chuck which promptly releases the work as soon as the fluid pressure has been removed.

It is a still further object of my invention to utilize but one pressure chamber to energize a plurality of holding means.

The principles and characteristic features of my invention and the manner of making and constructing and using my improved air chuck will further appear in the accompanying drawings and the following description explaining the best modes in which I have contemplated using such principles.

Fig. 1 is a side elevational view of my chuck in cross section attached to a miller head, with the chuck piston under pressure;

Fig. 2 is a fragmentary, side elevational view of my chuck, similar to Fig. 1, with the pressure removed from said piston;

Fig. 3 is a front elevational view of my chuck partly broken away taken along the line 3—3 of Fig. 1;

Fig. 4 is a rear elevational view of my chuck taken along the line 4—4 of Fig. 1;

Figure 5:
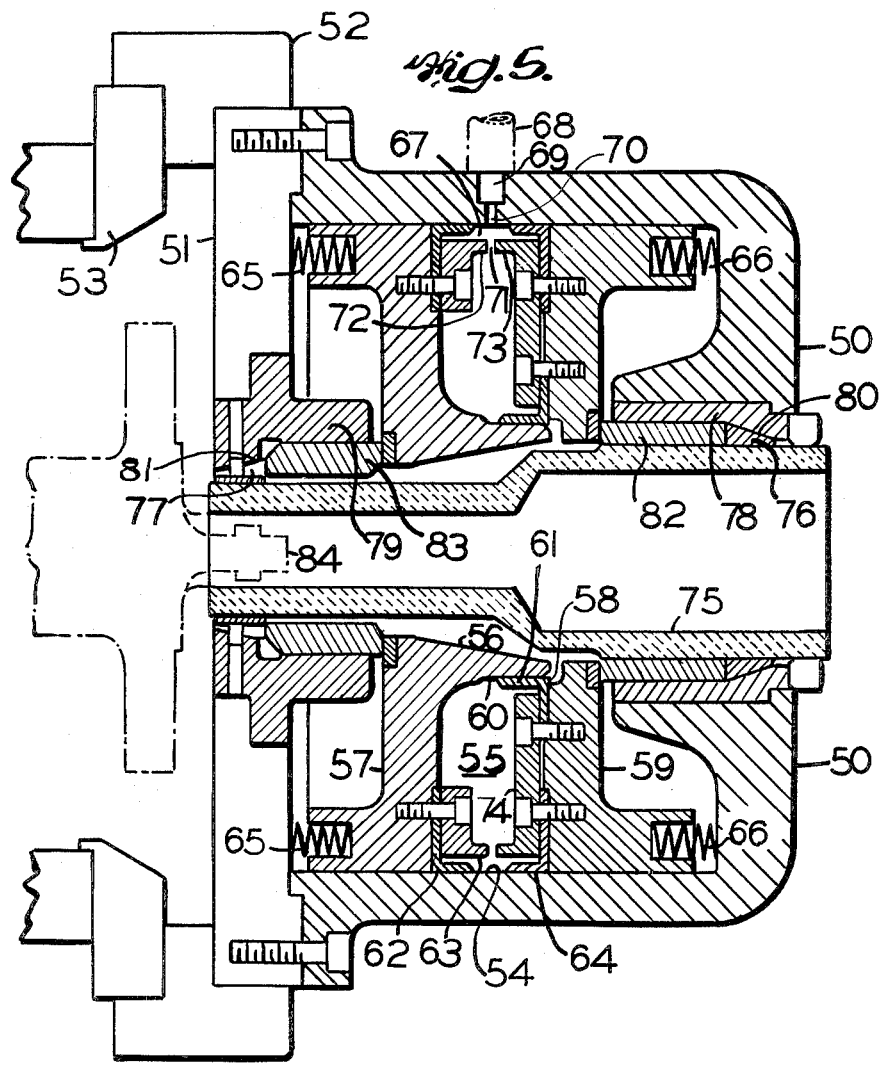
Fig. 5 is a side elevational view of a modification of my chuck which has means for gripping the work piece at two points; and, Fig. 6 is a side elevational view of a modification of my chuck, in cross section, wherein a diaphragm seals the air pressure chamber.

My improved chuck comprises an annular piston 1 moveable in an annular cylinder 2 formed in an annular housing 3 which is secured to the face plate 4 and head ring 5 of a miller. The piston 1 is made as an annular rim on the annular disc 6 which extends beyond the projected limits of the cylinder 2 into a bore 7 within the housing 3 where a rim 8 extends outward from said disc 6 parallel to the piston 1 to an apertured plate 9 which projects toward the axis of the bore 7 and housing 3. A collet 10 seats in a collet locating ring 11 which is affixed to the face plate 4 and which projects into the bore 7. When under pressure from the plate 9, the collet moves inwardly along the inclined face 12 of the collet locating ring 11 toward the axis of the bore 7 and toward the stop 28 seated in the collet locating ring.

Secured to the face 14 of the piston 1 are a pair of annular gaskets held by a pin or bolt 15. The outer edges 16 and 17 of the gaskets engage the walls 18 and 19 of the cylinder 2 and form a seal for the air chamber 20. Springs 21 recessed in rear face 22 of the disc 6 beneath the piston 1 engage the face plate 4 and bias the disc 6 and piston 1 toward the head 23 of the cylinder 2 thereby tending to bias the plate 9 away from the collet 10. The collet 10 is segmented and tends to move toward the plate 9 and away from engagement with the work piece 24. Escape of the collet from the collet locating ring is prevented by the overlap of the apertured plate 9 on the rim 25 of the collet.

Air is supplied to the air chamber 20 by means of a hose 26 which projects through the face of the housing 3.

To operate the chuck, a work piece 24 is moved into the bore 7 over the cutting tool 27 and between the opposing wall faces of the collet until the end of the work piece abuts the work stop 28 secured to the collet locating ring 11 inward of the oil seal 13. Air under pressure is then fed through the air hose 26 into the annular air chamber 20. As soon as the air pressure builds up in the air chamber, the piston 1 compresses the springs 21. Movement of the piston against the springs brings the plate 9 tightly against the rim 25 of the collet 10 and thereby forces the collet along the inclined face 12 of the collet locating ring 11 and down into firm engagement with the work piece 24. As shown in Figs. 1 and 2, the area for holding the work piece is immediately about or adjacent to the point or area in which the cutting tool 27 will engage the inner face of the work piece. Release of the air from the air chamber 20 allows the springs to bias the piston and plate outwardly thereby permitting the return of the collet and the freeing of the work piece.

Figure 6:
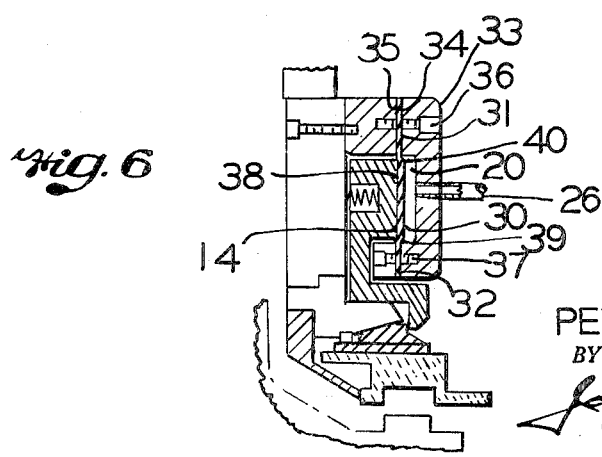

Instead of using the two gaskets above noted, I may provide an annular diaphragm 30 extending completely across the annular air chamber 20 as illustrated in Fig. 6. The annular diaphragm 30 is secured along its inner and outer perimeters 31 and 32 by the opposing faces 34 and 35 of the split housing 33. The housing may be held together by suitable means such as bolts 36 and 37. The inner face 38 of the diaphragm is in engagement with the face 14 of the piston 1 and any pressure generated in the air chamber 20 is transmitted to the piston and collet as heretofore. The diaphragm is preferably of reenforced rubber composition either natural or synthetic. However, the movement of the piston is so small that the workability of the diaphragm is not dependent on the stretch of the material used but rather on the slight excess of material in the chamber produced by dishing the diaphragm at its interior edges 39 and 40. Use of the diaphragm closed chamber effectively eliminates leakage from the air chamber.

It is sometimes desirable to hold the work piece in more than one area either because of the length of the work piece or because the piece is being worked on at several points. In either case, the provision of an additional point of holding increases the steadiness obtainable and reduces the tendency of a long work piece to "whip." It is particularly important to eliminate the tendency to whip in the work piece where, as here, the thread or finishing operation must be held within a tolerance of a few thousandths of an inch. I have modified my air chuck, as shown in Fig. 5, to provide for the gripping of the work piece at two points but such gripping is controlled by a single air chamber as heretofore.

In my modified air chuck, illustrated in Fig. 5, the housing 50 secured to the face plate 51 and centering ring 52 which is, in turn, secured to the head ring 53, forms the side 54 of the annular air chamber 55. The opposite side of the annular air chamber is formed by the inner face 60 of the flange 56 struck from the larger diameter piston body 57 and, additionally, by the rim 61 of the gasket 58 secured to the smaller diameter piston body 59. The rim 61 of the gasket 58 rides on the inner face 60 of the flange 56. The inner end of the air chamber 55 is formed by the piston body 57, its gasket 62 and the gasket retainer 63. The outer end of the air chamber is formed by the piston body 59 and its accompanying gaskets 58 and 64 together with the gasket retainer 74.

Paired springs 65 and 66 are mounted in the piston bodies 57 and 59 and press against the face plate 51 and the forward portion of the housing 50 respectively. These springs bias the piston bodies 57 and 59 toward each other.

Air under pressure enters the chamber 55 through a vestibule 67 from a hose 68 by means of inlet passages 69 and 70. The air passes through the vestibule 67 into the annular chamber 55 through passage 71 formed by the opposing faces of the rims 72 and 73 projecting upward from the gasket retainers 63 and 64 respectively. The rims 72 and 73 separate the piston bodies 57 and 59 and prevent the flanges on the gaskets 62 and 64 from covering the inlet 70. The touching faces of the rims 72 and 73 are sufficiently rough to allow the passage of air even should the two be meeting so that any air under pressure in the vestibule 67 will force itself between the rims and into the air chamber 55 where it will force the two piston bodies 57 and 59 apart.

The work piece 75 is mounted on a pair of collets 76 and 77 which are seated in the collet locating rings 78 and 79 respectively. As heretofore, the collet locating rings have inclined faces 80 and 81 at their further extremities to guide the collets toward the axis of the housing 50 and into engagement with the work piece 75. Pusher rings 82 and 83 are in engagement with the rear faces of the piston bodies 59 and 57 and in engagement with the collets 76 and 77.

In operation, air enters the chamber 55 and forces the piston bodies 57 and 59 against their springs 65 and 66 and against the pusher rings 83 and 82. Pressure on the pusher rings 82 and 83 is directly transmitted to the collets 77 and 76 which move along the inclined faces 81 and 80 into engagement with the work piece 75. It is to be understood that this type of miller does not require that the work piece revolve but on the contrary the cutting tool 84 moves off the center line of the housing 50 and into engagement with the inner face of the work piece 75.

When the air pressure is released, the springs 65 and 66 force the piston bodies back into normal position and the collets 76 and 77 which are segmented follow the piston bodies in returning to normal position thereby releasing the work piece 75 which then may be extricated from the chuck.

It is to be understood that the movement of the piston bodies 57 and 59 is restricted so that the rim 61 of the gasket 58 never parts from the face 60 of the flange 56.

I find that it is sometimes desirable to provide bearing rings 85 and 86 at the rear faces of the piston bodies 57 and 59 in juxtaposition to the pusher rings 82 and 83 in order that no amount of undue wear shall occur at these points.

Having described my invention, I claim:

1. In combination an annular housing containing a work receiving bore, an inner peripheral lip on said housing adjacent said bore, a chamber in said housing formed by said lip and the peripheral walls of said housing, an expansible collet mounted in said bore adjacent said lip, a rim on said collet projecting toward said lip, an annular ridged plate having a centrally located aperture of a diameter greater than the diameter of said bore, the area adjacent the outer edge of said plate located within and movable axially of said chamber, the inner edge of said plate adjacent said aperture being engageable with said rim on said collet, means for introducing fluid under pressure into said chamber and moving said apertured plate away from the face of said housing and against said collet, and spring means for positioning the outer edge of said plate within said chamber and for moving said plate toward the face of said housing.

2. In combination an annular housing containing a work receiving bore, a lip on said housing, a chamber in said housing having its fixed walls formed by said lip and the peripheral walls of said housing, an expansible collet mounted in said bore in juxtaposition with said lip, a flange on said collet projecting toward said lip, an apertured plate projecting within and without said chamber, the area of said apertured plate adjacent the outer edge thereof forming a piston movable axially within said chamber, a flange on the inner periphery of said plate engageable with the flange on said expansible collet, and an aperture in said housing for introducing fluid under pressure into said chamber for moving said apertured plate away from the face of said housing.

3. In combination an annular housing containing a work receiving bore, a lip on said housing, a chamber in said housing formed by said lip and the peripheral walls of said housing and closed by a flexible end wall, an expansible collet mounted in said bore in juxtaposition with said lip, a flange on said collet projecting toward said lip, an apertured plate projecting within and without said chamber, the area of said apertured plate adjacent the outer edge thereof being in abutting relationship with said flexible wall in said chamber, a flange on the inner periphery of said apertured plate engageable with the flange on said expansible collet, an aperture in said housing for introducing fluid under pressure into said chamber for flexing said flexible wall and for moving said apertured plate away from the face of said housing, and spring means recessed in said apertured plate for biasing said plate toward said flexible wall.

4. A fluid actuated chuck comprising an annular housing enclosing a work receiving bore, an annular, expandable air chamber within said housing having one side formed by said housing and a pair of interlocking, axially movable pistons forming the other three sides thereof, a collet within each end of said bore for gripping work positioned in said bore, means for introducing fluid under pressure into said chamber between said pistons, operative connections between said pistons and said collets causing the collets to contract and grip said work upon expansion of said air chamber, and spring means extending between said pistons and said housing for contracting said air chamber and positioning said pistons upon retraction of said fluid under pressure.

PETER P-G. HALL.

References Cited in the file of this patent
UNITED STATES PATENTS

| Number | Name | Date |
|---|---|---|
| 2,372,592 | Lovely | Mar. 27, 1945 |
| 2,462,155 | Benjamin et al. | Feb. 22, 1949 |
| 2,509,873 | Church | May 30, 1950 |